United States Patent Office 3,220,980
Patented Nov. 30, 1965

3,220,980
POLYMERIZATION OF AROMATIC CYCLIC CARBONATE MONOMERS
Robert J. Prochaska, Interlaken, Mass., assignor to General Electric Company, a corporation of New York
No Drawing. Original application Dec. 21, 1961, Ser. No. 161,306. Divided and this application July 1, 1964, Ser. No. 392,060
2 Claims. (Cl. 260—47)

This application is a division of application Serial No. 161,306, filed December 21, 1961.

This invention relates to aromatic carbonates, and more particularly relates to the preparation of novel and useful cycle carbonate monomers which may be polymerized to provide high molecular weight aromatic carbonate polymers.

Cyclic carbonates have been known and studied for many years since ethylene carbonate was first prepared by Nemirowski in 1883 [J. prakt. Chem. (2) 28, 439 (1883)]. This material has been definitely established to be the monomeric 5-membered ring compound. In 1898, Einhorn [Ann. 300, 135 (1898)] prepared a cyclic carbonate from catechol and phosgene. This simple 5-membered cyclic aryl carbonate is the only known cyclic aryl carbonate reported in the literature. It is, however, a highly stable monomer, incapable of being polymerized to a high molecular weight polycarbonate. In 1930, Carothers and Natta [JACS 52, 314–26 (1930)] prepared the cyclic trimethylene carbonate which is the 6-membered ring compound. They investigated the equilibrium between polymer and monomer and found that the monomer could be polymerized to yield a polymer having a degree of polymerization between 38 and 45. They also succeeded in isolating the cyclic dimeric tetramethylene carbonate. In 1933, Hill and Carothers [JACS 55, 5031–39 (1933)] succeeded in preparing many cyclic aliphatic monomeric and dimeric carbonates by depolymerizing the corresponding polymers under vacuum at a temperature just below the point of thermal decomposition. Although Carothers was able to synthesize many cyclic aliphatic carbonates, the only one he was successful in polymerizing to a reasonably high molecular weight was trimethylene carbonate. The resultant polymers were too low melting and too easily decomposed to be of value.

A more recent method for polymerizing cyclic aliphatic carbonate monomers is described in British Patent 872,983. Aside from the fact that the method therein described is directed to the preparation of aliphatic carbonate polymers which are too low melting and thermally unstable to be of any commercial value, the specific method employed by the patentee requires certain conditions differing from the present method for polymerizing aromatic cyclic carbonate monomers.

As far as I am aware, aromatic cyclic carbonate monomers capable of being polymerized to provide high molecular weight aromatic carbonate polymers have heretofore not been prepared. In accordance with my invention, however, aromatic cyclic carbonate monomers have been prepared from which the corresponding aromatic carbonate polymers may be produced. These polymers are high melting, thermally stable materials. Therefore, by means of my invention, the scope of cyclic carbonate materials available for use in the art has been enlarged.

It is the primary object of the present invention to provide a new class of cyclic carbonate monomers which can be polymerized to form aromatic carbonate polymers.

Another object of the present invention is to provide a method for preparing such carbonate monomers.

A further object of the present invention is to provide a process for preparing high molecular weight aromatic polycarbonate resins directly from such aromatic carbonate monomers.

In general, in accordance with my invention, an ortho bisphenol is reacted with a carbonyl halide in the presence of a specific type of acid acceptor to produce aromatic cyclic carbonate monomers corresponding to the formula (I) 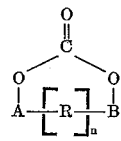

wherein:
A and B are aromatic radicals, such as phenyl, diphenyl, naphthyl; R is attached to A and B ortho relative to the oxygen atoms and is selected from the group consisting of an alkylidene group, such as methylene, ethylene, propylene, butylene; a sulfone group; a carbonyl group; a sulfoxy group; sulfur; and oxygen; and $n$ is a whole number from 0 to 1.

Unexpectedly it has been discovered that when the reaction of an ortho bisphenol with a carbonyl halide is conducted in the presence of an acid acceptor which is essentially a weak base of the order of basicity of a tertiary amine, a cyclic carbonate monomer is produced but if the reaction of a carbonyl halide with an ortho bisphenol is carried out in the presence of an acid acceptor which is a strong base, such as sodium hydroxide the resultant product is the expected linear carbonate polymer. On the other hand, the reaction of a bisphenol, other than an ortho bisphenol, such as a para or a meta bisphenol with a carbonyl halide in the presence of a weak base such as a tertiary amine also results in the production of a linear carbonate polymer.

The term ortho bisphenol as used herein is intended to embrace within its scope dihydric phenols corresponding to the formula:

(II) 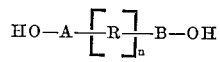

wherein:
A and B are aromatic radicals, R has the meaning given above, and is attached ortho relative to the respective hydroxyl groups, and $n$ is a whole number between 0 and 1.

A particularly preferred class of ortho bisphenols falling within the scope of Formula II will generally conform to the formula:

(III) 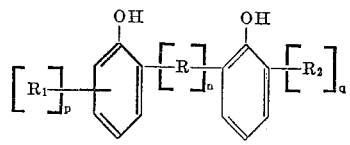

wherein:
R has the meaning given above in Formula II, $R_1$ and $R_2$ are radicals selected from the group consisting of alkyl radicals, such as methyl, ethyl, butyl, propyl, isopropyl, aryl radicals, such as phenyl, diphenyl, naphthyl; alkylaryl radicals, such as tolyl, xylyl, ethylphenyl; aralkyl radicals, such as benzyl, phenyl-ethyl; halogen atoms, such as fluorine, chlorine, bromine; haloaryl radicals, such as monochlorophenyl, dibromophenyl, tetrachlorophenyl, monofluorophenyl; sulfone radicals; nitro radicals; alkoxy radicals, such as methoxy, ethoxy; aryloxy radicals, such as phenoxy; $n$ is a whole number between 0 and 1; and $p$ and $q$ are whole numbers from 0 to 4. Mixtures of the radicals identified by $R_1$ or $R_2$ may also be used.

Specific examples of ortho bisphenols falling within the scope of Formulae II and III above are, for instance, 2,2' dihydroxydiphenyl; 2,2' dihydroxydiphenyl-methane; 2,2' dihydroxy-5,5'-dimethyldiphenylmethane; 2,2 (2,2'-dihydroxy-5,5'-dimethyldiphenyl) propane; 2,2(2,2'-dihydroxy-4,4'-dimethyldiphenyl)propane; 2,2' - dihydroxy-5,5'-dichlorodiphenylmethane; 2,2' dihydroxy-3,3',5,5' tetramethyldiphenylmethane; 2,2' dihydroxy 3,3' di-t-butyl-5,5' dimethyldiphenylmethane; 2,2' dihydroxy-diphenyl ether; 2,2' dihydroxydiphenyl sulfone; 2,2' dihydroxybenzophenone; 2,2-bis (2-hydroxyphenyl) propane; 2,2' dihydroxy diphenyl sulfide; 2,2 (2,2' dihydroxy, 5 phenoxy, 4' chlorophenyl) butane; 3,3 (2,2' dihydroxy, 4 chloro, 5' methoxyphenyl) pentane; 2,2' dihydroxy 5' chlorodiphenyl methane; and 3,3 (2,2' dihydroxy 5,5' dimethoxy diphenyl) pentane.

The carbonyl halide employed in the preparation of a cyclic carbonate monomer in accordance with the present invention may be carbonyl chloride or carbonyl bromide although carbonyl chloride (phosgene) is preferred, due primarily to its availability. The molar quantity of the carbonyl halide used should be substantially equal to the molar quantity of the ortho bisphenol to be reacted. Theoretically, one mole of carbonyl halide reacts with one mole of ortho bisphenol to produce one mole of the cyclic monomer and two moles of the corresponding halo acid. The two moles of the halo acid are in turn "attached" by two moles of the acid acceptor.

The reaction between a carbonyl halide and an ortho bisphenol to provide a cyclic carbonate monomer may be successfully carried out at temperatures ranging from values below about −10° C. to values above 95° C. However, higher yields of the desired monomeric product may be obtained by maintaining the temperature of reaction below the reflux temperature (at atmospheric pressure) of the reaction mixture, and preferably below 20° C.

In general, any acid acceptor which is essentially a weak base of the order of basicity of a tertiary amine may be employed in accordance with the method of the present invention. Examples of such acid acceptors are aliphatic tertiary amines, such as, for example, trimethyl amine; triethylamine; tripropylamine; as well as aromatic tertiary amines such as, triphenylamine; N,N dimethylaniline; and N,N dimethyl-p- nitroaniline. Included also are the heterocyclic tertiary amines such as, for example, pyridine; picoline; pyridazine, pyrimidine; pyrazine, quinoline; and isoquinoline. Mixtures of two or more of such tertiary amines may also be used.

In many instances, the tertiary amine employed may act as a solvent for the reactants, as is the case of pyridine, for example. In the event the amine used does not act in this capacity, a common solvent for the reactants which is inert in the sense that it does not enter into the reaction, may be used. Examples of such solvents are benzene, xylene, methylene chloride, ethylenedichloride, propylenedichloride, chlorobenzene, toluene, carbon tetrachloride, acetone, chloroform, diethyl ether, and cyclohexanone. Although the quantity of solvent used may vary within wide limits, it has been discovered that higher yields of the desired monomeric cyclic carbonate may be obtained when the weight ratio of the dihydric compound to solvent is less than 0.2 and preferably less than 0.1.

The process for preparing an aromatic polycarbonate resin in accordance with the present invention comprises heating an aromatic cyclic carbonate monomer of the type falling within the scope of Formula I above, in the presence of a catalytic amount of at least one member of the class consisting of alkali metals, such as sodium, potassium, rubidium, cesium; alkali metal hydroxides, such as sodium hydroxide, potassium hydroxide; alkali metal carbonates, such as sodium carbonate, potassium carbonate; alkali metal alkoxides, such as sodium methoxide, potassium ethoxide; alkali metal aryloxides, such as sodium phenate, potassium bisphenate; quaternary ammonium hydroxides, such as tetramethylammonium hydroxide; cetyl triethylammonium hydroxide; tetra n-heptyl ammonium hydroxide; tetraethyl ammonium hydroxide.

In general, the polymerization of the cyclic carbonates to aromatic carbonate polymers may be conducted either in a fusion cook or in a solvent system. As will be appreciated by those skilled in the art, it is possible to employ two or more different aromatic cyclic monomers in either polymerization technique in the event a carbonate copolymer rather than a homopolymer is desired.

In the event the fusion cook technique is employed, temperatures as high as 350° C. may be required to initiate the polymerization reaction, depending upon the particular cyclic carbonate and catalyst used. On the other hand, should the reaction be conducted in a solvent system, polymerization may be successfully initiated at temperatures as low as 10° C. or lower, although temperatures ranging from about 20° C. to about 130° C. are generally preferred, since the maximum degree of polymerization of the cyclic carbonates has been found to occur within that temperature range.

The reaction time at any given temperature will vary with each particular cyclic carbonate, the type and amount of catalyst used, and the amount, if any, of solvent present. Generally speaking, the polymerization reaction is permitted to continue at a fixed temperature until the viscosity of the resulting polymer or polymer solution reaches a maximum, thus insuring as complete a degree of polymerization as possible. In the case of the fusion cook, heating for a period of from several seconds to a few minutes will often suffice, and the increase in viscosity may be observed visually. Should a solvent system be employed, the viscosity of the polymer will reach a specific maximum after a period of time which may last from but a few minutes to several hours, depending again upon the specific cyclic carbonate used and the amount of solvent and catalyst employed. Continued heating of the formed polymer after the maximum viscosity is attained will only tend to decrease this value. The period of heating any given cyclic at a fixed temperature until this maximum is reached may be ascertained easily by periodic tests made on the viscosity of the polymer formed. Generally, a period of heating of from less than one hour to four hours or more will be sufficient to achieve this maximum value.

Any organic solvent, inert in the sense that it does not enter into the polymerization reaction and preferably one in which the resulting polymer is soluble, may be employed. Examples of suitable solvents are: benzene, xylene, ethylene dichloride, propylene dichloride, chlorobenzene, toluene carbon tetrachloride, acetone, chloroform, cyclohexanone, pyridine, and methylene chloride. The catalytic amount (i.e., the amount sufficient to initiate polymerization) of catalyst used in the process of the present invention may also vary within a wide range, depending upon the temperature of reaction, the amount of solvent employed, and the particular cyclic carbonate which is to be polymerized. Satisfactory results have been obtained by employing as little as 0.001% by weight of the catalyst, based upon the weight of the cyclic carbonate to be polymerized. Generally, however, amounts varying from 0.01% to about 3% by weight are advantageously used. Although the catalyst may be added in amounts greater than 3%, such addition is neither necessary nor practical, since it tends to reduce the molecular weight of the polymer formed and to contaminate the resin product which is obtained.

In order that those skilled in the art may better understand how the present invention may be practiced, the following examples are given by way of illustration and not by way of limitation. All parts and percentages are by weight unless otherwise noted. Where indicated, the molecular weight determinations were made by the measurement of the depression of the freezing point of benzene. Values within ±12% of the calculated molecular weight of any particular cyclic carbonate were deemed to be within the acceptable range of experimental error involved in such molecular weight determinations.

*Example 1*

To a mixture of 82 parts of 2,2'-dihydroxydiphenyl, 80 parts of pyridine, and 1000 parts of methylene chloride were added 60 parts of phosgene gas for a period of about 40 minutes. The reaction mixture was washed with dilute hydrochloric acid and water, respectively, and the methylene chloride subsequently removed by evaporation. The residue was recrystallized twice from carbon disulfide to yield a white crystalline solid, melting point 101–102° C. This material was found to be identical with the structure of a cyclic 2,2'-(diphenyl) carbonate.

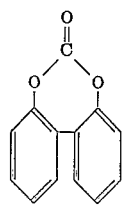

|  | Found | Calculated |
| --- | --- | --- |
| Molecular Weight | 216 | 212 |
| Carbon (percent) | 73.56 | 73.58 |
| Hydrogen (percent) | 3.71 | 3.80 |

*Example 2*

Sixty parts of phosgene gas were slowly bubbled into a mixture of 80 parts of 2,2' dihydroxydiphenylmethane, 80 parts of pyridine and 1000 parts of methylene chloride. After the reaction had subsided, the reaction mixture was treated in the same manner as outlined in the previous example. A white solid having a melting point of 101–102° C. was obtained, and identified as cyclic 2,2' (diphenylmethane) carbonate. The product was found to be identical with the structure shown in the formula below:

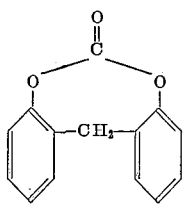

|  | Found | Calculated |
| --- | --- | --- |
| Molecular Weight | 218 | 226 |
| Carbon (percent) | 73.96 | 74.32 |
| Hydrogen (percent) | 4.68 | 4.46 |

*Example 3*

114 parts 2,2' dihydroxy 5,5' dimethyldiphenylmethane were dissolved in 2280 parts methylene chloride (5% solids on CH$_2$Cl$_2$) and 118 parts pyridine. The stirred solution was cooled in an ice bath to 0°–5° C. and phosgene bubbled in at a rate of one part per minute until the reaction was complete (55 minutes). The reaction mixture wasw ashed first with an HCl-water mixture to remove pyridine, followed by several water washes to remove pyridine hydrochloride. The solution was dried over anhydrous calcium chloride and evaporated to dryness in an air stream. The residual solid was slurried with carbon tetrachloride several times to yield successive crops of the crude monomeric cyclic 2,2' (5,5' dimethyldiphenylmethane) carbonate. The crude product was recrystallized from carbon disulfide to yield 89 parts (70% yield) of the desired product.

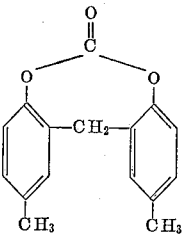

|  | Found | Calculated |
| --- | --- | --- |
| Carbon (percent) | 75.57 | 75.59 |
| Hydrogen (percent) | 5.73 | 5.51 |
| Molecular Weight | 236 | 254 |

*Example 4*

Fifty parts 2,2' dihydroxy 5,5' dimethyldiphenylmethane were dissolved in 333 parts of methylene chloride (15% solids based on CH$_2$Cl$_2$) and 60 parts of pyridine. Phosgene was bubbled into the stirred solution at 0.4 part per minute and the temperature was allowed to rise to the reflux temperature (approximately 42° C.). The time of reaction was 65 minutes. The workup procedure was the same as that described in Example 3. The yield of purified monomeric cyclic 2,2' (5,5' dimethyldiphenylmethane) carbonate was 30 parts (approximately 54%).

Example 3 thus demonstrates the desirability of employing dilute solutions and cooling to increase the yield of monomeric cyclic carbonates from ortho bisphenols. However, as seen in Example 4, even the reaction at high solids content and reflux provides a satisfactory yield of the cyclic carbonate monomer.

*Example 5*

71.8 parts of 2,2 (2,2' dihydroxy-5,5' dimethyldiphenyl) propane were dissolved in a solution containing 53.2 parts of pyridine and 463 parts of methylene chloride. Phosgene was then bubbled into the mixture for 57 minutes at a rate of 0.46 part per minute. The excess phosgene was removed with water and the methylene chloride solution washed once with dilute hydrochloric acid, three times with water, and subsequently dried over anhydrous calcium chloride. After drying was completed, the methylene chloride was evaporated to yield a crystalline solid which, after sublimation and recrystallization from carbon disulfide, was found to have a melting point of 186–187° C. This solid was identified as cyclic 2,2'-[2,2 (5,5' dimethyldiphenyl) propane] carbonate.

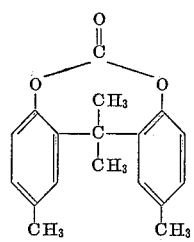

|  | Found | Calculated |
| --- | --- | --- |
| Carbon (percent) | 76.72 | 76.60 |
| Hydrogen (percent) | 6.65 | 6.38 |
| Molecular Weight | 271 | 280 |

*Example 6*

The procedure of Example 5 was followed with the substitution of 2,2 (2,2' dihydroxy-4,4' dimethyldiphenyl) propane for the 2,2 (2,2' dihydroxy 5,5' dimethyldiphenyl) propane used in the later example. The white crystalline solid which resulted had a melting point of 95.6–96.5° C. and was identified as cyclic 2,2'[2,2 (4,4' dimethyldiphenyl) propane] carbonate.

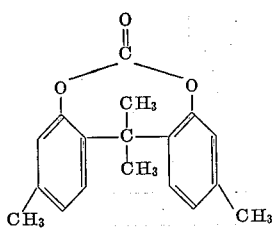

|  | Found | Calculated |
|---|---|---|
| Carbon (percent) | 76.81 | 76.60 |
| Hydrogen (percent) | 6.36 | 6.38 |
| Molecular Weight | 262 | 282 |

*Example 7*

Twenty-seven parts of 2,2' dihydroxy 5,5' dichlorodiphenylmethane were dissolved in a pyridine-methylene chloride solution comprising 24 parts of pyridine and 540 parts of methylene chloride. The solution was cooled to 0–5° C. and phosgene bubbled into the cooled solution for one hour at 0.2 part per minute. After the excess phosgene was removed with water, the reaction mixture was washed respectively with dilute hydrochloric acid and water and then dried over anhydrous calcium chloride. After drying, the methylene chloride was evaporated to yield a tan colored crystalline solid which has subseqently recrystallized from carbon disulfide to yield a white crystalline solid having a melting range of 162–165° C. This solid was identified as cyclic 2,2' (5,5' dichlorodiphenylmethane) carbonate by infrared analysis.

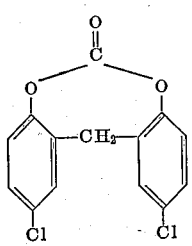

*Example 8*

Ten parts of 2,2' dihydroxy-3,3', 5,5' tetramethyldiphenylmethane were dissolved in a solution consisting of 9.4 parts pyridine and 115 parts of methylene chloride. Phosgene was bubbled into the stirred solution for 40 minutes at the rate of 0.15 part per minute. The excess phosgene was thereafter removed with water and the methylene chloride layer washed once with dilute hydrochloric acid and three times with water, and subsequently dried over anhydrous calcium chloride. The methylene chloride was then removed in an air stream to yield a white crystalline solid which, after three recrystallizations from carbon disulfide and one recrystallization from cyclohexane, was found to have a melting point of 166–167° C. The purified solid had the following analysis.

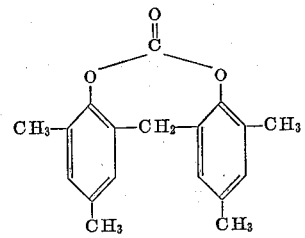

|  | Found | Calculated |
|---|---|---|
| Hydrogen (percent) | 6.57 | 6.38 |
| Carbon (percent) | 76.40 | 76.60 |
| Molecular Weight | 250 | 280 |

*Example 9*

Twenty parts of 2,2' dihydroxy-3,3' di-t-butyl-5,5' dimethyldiphenylmethane were dissolved in a pyridine-methylene chloride solution comprising 9 parts of pyridine and 129 parts of methylene chloride. Phosgene was thereafter bubbled into the solution for 1¾ hours at a very low rate. After the excess phosgene was removed with water, the reaction mixture was washed respectively with dilute hydrochloric acid and water, and then dried over anhydrous calcium chloride. After drying, the methylene chloride was evaporated to yield a tan colored solid which was subsequently washed with cyclohexane, and thereafter recrystallized from benzene. The cyclic 2,2'-(3,3' di-t-butyl-5,5' dimethyldiphenylmethane) carbonate thus formed was found to have a melting point of 203–204° C.

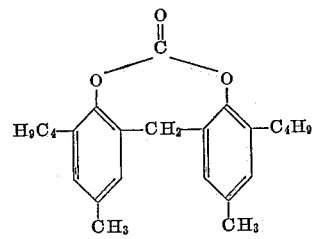

|  | Found | Calculated |
|---|---|---|
| Carbon (percent) | 78.62 | 78.68 |
| Hydrogen (percent) | 8.31 | 8.20 |
| Molecular Weight | 324 | 366 |

*Example 10*

Five parts of 2,2' dihydroxydiphenylether were dissolved in a solution consisting of 4.7 parts of pyridine and 70 parts of methylene chloride. Phosgene was thereafter bubbled into the solution at a rate of 0.1 part per minute for a period of one hour. The excess phosgene was removed with water and the methylene chloride-pyridine solution washed once with dilute hydrochloric acid and three times with water before drying over anhydrous CaCl$_2$. Thereafter, the dried solution was evaporated to yield a yellow solid which was subsequently sublimed under vacuum to provide a crystalline solid having a melting point of 95–100° C. This solid was identified as cyclic 2,2′ (diphenylether) carbonate by infrared analysis.

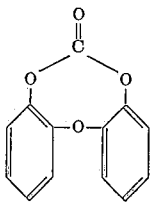

From the foregoing example, it will be appreciated that any ortho bisphenol falling within the scope of Formula II above may be reacted with a carboyl halide in the presence of an acid acceptor of the type set forth above, e.g., a tertiary amine, to provide an aromatic cyclic carbonate monomer of the invention. Thus, a methoxy substituted aromatic cyclic carbonate may be prepared, for instance, by reacting 3,3 (2,2′ dihydroxy 5,5′ dimethoxydiphenyl) pentane with phosgene in the presence of an acid acceptor such as dimethyl aniline to produce a cyclic 2,2′[3,3 (5,5′ dimethoxydiphenyl) pentane] carbonate which would have the following structure:

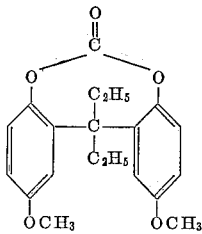

Example 11

This example illustrates the preparation of a linear aromatic polycarbonate resin by polymerizing a cyclic carbonate in the presence of a basic catalyst by use of the fusion cook technique.

Two samples of cyclic 2,2′ (diphenyl) carbonate from Example 1 were placed in small test tubes and heated to 200° C. in a silicone oil bath. Both samples melted to clear liquids. A minute piece of solid anhydrous potassium carbonate was introduced into one of the samples, the other being the control, and the bath temperature maintained at 200–240° C. The material in the tube containing the trace of $K_2CO_3$ showed an appreciable increase of viscosity with time, whereas the control (no $K_2CO_3$) showed no change in viscosity. After 30 minutes heating, fibers could be drawn from the melt of the tube containing $K_2CO_3$ whereas the control showed no such behavior.

Example 12

This example illustrates the preparation of a polycarbonate resin from cyclic 2,2′ (diphenylmethane) carbonate.

A sample of cyclic 2,2′ (diphenylmethane) carbonate prepared in accordance with the method outlined in Example 2 was placed in a small test tube and heated to 210–230° C. in a silicone oil bath. After the sample had melted, a minute quantity of anhydrous potassium carbonate was added. Almost immediate bodying was noted, and within minutes the thin watery melt was transformed to a viscous resinous mass from which fibers could be drawn. Reduced viscosities in dioxane (30° C., 0.4 g./100 ml. concentration) for the cyclic 2,2′ (diphenylmethane) carbonate and the thermally polymerized product were .02 and .27 respectively, showing that appreciable polymer buildup had occurred.

Example 13

This example illustrates the preparation of a polycarbonate resin from cyclic 2,2′ (5,5′ dimethyldiphenylmethane) carbonate.

A minute quantity $K_2CO_3$ was added to a molten sample of cyclic 2,2′ (5,5′ dimethyldiphenylmethane) carbonate. The viscosity of the melt increased rapidly with no apparent change in color. After a few minutes, the viscous mass was cooled with no evidence of crystallization, and the reduced viscosity of the resin in dioxane at 30° C. (0.4 g./100 ml. concentration) was found to be 0.53.

Example 14

This example illustrates the preparation of a polycarbonate resin from cyclic 2,2′ (5,5′ dimethyldiphenylmethane) carbonate by polymerizing that monomer in a solvent system.

0.25 part cyclic 2,2′ (5,5′ dimethyldiphenylmethane) carbonate was dissolved in 3 parts chlorobenzene at 110° C. in a silicone oil bath. A small quantity of anhydrous potassium carbonate was introduced and after the immediate viscosity buildup (15–30 seconds) the viscous solution was poured into a large excess of methyl alcohol. After several washes with methyl alcohol, the white fibrous precipitate was dried, dissolved in methylene chloride and cast into a clear, tough, flexible film. The reduced viscosity of this polymer in dioxane at 30° C. (0.4 g./100 ml. concentration) was determined to be 0.58. The cast film was found to have a tensile strength of 6,000 p.s.i. and an elongation of 2–3%, as measured on the Instron. The flow temperature (9 mm. point) of the polymer was 170–180° C.

Example 15

0.25 part of 2,2′ (5,5′ dimethyldiphenylmethane) carbonate was dissolved in 2 parts of methylene chloride and a catalytic amount of solid potassium hydroxide added at room temperature. The polymerization reaction started immediately and the point or maximum solution viscosity was reached in about five minutes. The polymer was precipitated with methanol, washed with methanol and dried to yield a white, fibrous solid having a reduced viscosity of 0.56 at 30° C. in dioxane at 0.4 g./100 ml.

Example 16

Example 15 was repeated except that a 10% aqueous solution of tetraethylammonium hydroxide was used as a catalyst instead of the potassium hydroxide used in the previous example. The polymer obtained was precipitated with methanol, washed with methanol and subsequently dried to yield a white, fibrous solid having a reduced viscosity of 0.39 at 30° C. in dioxane at 0.4 g./100 ml.

Example 17

0.5 part of cyclic 2,2′ [2,2(5,5′ dimethyldiphenyl) propane] carbonate was dissolved in 2 parts of chlorobenzene at 120° C. A catalytic amount of solid anhydrous potassium carbonate was added. An immediate and rapid viscosity increase was noted and after ten minutes the viscous solution was poured into methanol to yield a tough, white, fibrous polymer having a reduced viscosity of 0.51 at 30° C. in dioxane at 0.4 g./100 ml.

Example 18

0.5 part of cyclic 2,2′ (3,3′ 5,5′tetramethyldiphenylmethane) carbonate was dissolved in 2 parts of chlorobenzene at 120° C. A catalytic amount of solid anhydrous potassium carbonate was added. An immediate and rapid viscosity increase was noted and after 10 minutes the viscous solution was poured into methanol to yield a white, fibrous polymer having a reduced viscosity of 0.56 at 30° C. in dioxane at 0.4 g./100 ml.

Example 19

This example illustrates the attainment of a maximum viscosity in a polycarbonate resin by heating a cyclic carbonate in a solvent solution for a given time period at a fixed temperature. Continued heating of the polymer solution after the maximum viscosity was obtained resulted in a decrease of this maximum value.

One part of 2,2'(5,5'dimethyldiphenylmethane) carbonate was dissolved in 5 parts of chlorobenzene, a minute quantity of $K_2CO_3$ added, and the mixture slowly heated at 80° C. Periodic tests of the solution viscosity were made, and after about 1½ hours, a maximum viscosity of 0.37 (in dioxane at 30° C., 0.4 g./100 ml.) was obtained. After an additional 1½ hours heating at 80° C. (total heating three hours), the reduced viscosity dropped to 0.23.

Similarly, a second test was made with sample of 2,2'-(5,5'dimethyldiphenylmethane) carbonate dissolved in chlorobenzene. This time the polymerization was permitted to continue at 100° C. until the maximum solution viscosity was obtained. Half of the polymer solution was precipitated to yield a tough, fibrous polymer having a reduced viscosity of 0.70. The remaining half of the viscous polymer solution was heated to 135° C. for an additional 10 minutes before precipitating the polymer, which was found to have reduced viscosity of 0.45.

From the foregoing examples, it will be appreciated that the aromatic cyclic carbonate monomers of the present invention afford a simplified process for preparing high molecular weight aromatic polycarbonate resins. Since the polymerization of the cyclic carbonate monomers to form high molecular weight polycarbonate resins neither requires the use of a toxic carbonyl halide, nor results in the evolution of a corrosive gas, such as HCl, the polycarbonate resins may be polymerized from the cyclic carbonate monomers at their place of use. Accordingly, large and intricate castings of polycarbonate resin may be prepared by polymerizing a cyclic carbonate monomer or mixture of such monomers in situ at the particular installations requiring such resin castings. In addition, the cyclic carbonate monomers may be employed as potting compounds and in the production of coatings and films by in situ polymerization techniques.

The polycarbonate resins prepared from the cyclic carbonate monomers of the invention have utility in the same applications as previously known aromatic carbonate polymers. For example, they are useful in the manufacture of films, fibers, molded or extruded parts, and in the preparation of surface coatings for use in structural, decorative, and electrical applications.

It should be understood that this invention is not to be considered limited to any of the specific embodiments herein disclosed, and may be practiced in other ways without departure from the spirit of the invention and the scope of the appended claims.

What I claim as new and desire to secure by Letters Patent of the United States is:

1. A process for preparing an aromatic carbonate polymer which process comprises heating an aromatic carbonate monomer in the presence of a catalytic amount of at least one member selected from the class consisting of
   an alkali metal;
   a hydroxide, a carbonate, an alkoxide and an aryloxide of an alkali metal; and a quaternary ammonium hydroxide;
said aromatic carbonate monomer having the formula

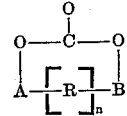

wherein:
   A and B are monocyclic, carbocyclic aromatic rings;
   R is attached to A and B ortho relative to the oxygen atoms and is selected from the class consisting of an alkylidene group, a sulfone group, a carbonyl group, sulfur, and oxygen; and
   $n$ is a whole number from 0 to 1.

2. The process of claim 1 in which the aromatic carbonate monomer is heated in an inert organic solvent therefor.

References Cited by the Examiner
UNITED STATES PATENTS 3,137,706 6/1964 Prochaska ---------- 260—47
3,155,683 11/1964 Moody -------------- 260—47

MURRAY TILLMAN, *Primary Examiner.*

SAMUEL H. BLECH, *Examiner.*